(12) United States Patent
Tanaka et al.

(10) Patent No.: US 7,290,259 B2
(45) Date of Patent: Oct. 30, 2007

(54) VIRTUAL COMPUTER SYSTEM WITH DYNAMIC RESOURCE REALLOCATION

(75) Inventors: Tsuyoshi Tanaka, Kokubunji (JP); Naoki Hamanaka, Tokyo (JP); Toshiaki Tarui, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 09/942,611

(22) Filed: Aug. 31, 2001

(65) Prior Publication Data
US 2002/0087611 A1 Jul. 4, 2002

(30) Foreign Application Priority Data
Dec. 28, 2000 (JP) ............... 2000-401048

(51) Int. Cl.
G06F 9/455 (2006.01)
G06F 9/50 (2006.01)

(52) U.S. Cl. ............... 718/1; 718/104; 718/105
(58) Field of Classification Search ............... 712/10, 712/11, 13; 718/100–104, 1
See application file for complete search history.

(56) References Cited

U.S. PATENT DOCUMENTS

| | | | |
|---|---|---|---|
| 6,279,046 B1 * | 8/2001 | Armstrong et al. | 710/5 |
| 6,438,671 B1 * | 8/2002 | Doing et al. | 711/173 |
| 6,633,916 B2 * | 10/2003 | Kauffman | 709/229 |
| 6,651,125 B2 * | 11/2003 | Maergner et al. | 710/244 |
| 6,985,937 B1 * | 1/2006 | Keshav et al. | 709/223 |
| 2002/0069369 A1 * | 6/2002 | Tremain | 713/201 |

FOREIGN PATENT DOCUMENTS

| | | |
|---|---|---|
| JP | 6103092 | 4/1994 |
| JP | 6110715 | 4/1994 |
| JP | 926889 | 1/1997 |
| JP | 10301795 | 11/1998 |

OTHER PUBLICATIONS

Govil, Kinshuk et al. "Cellular Disco: Resource Management Using Virtual Clusters on Shared Memory Multiprocessors." ACM. Aug. 2000, pp. 229-262.*

* cited by examiner

Primary Examiner—Lewis A. Bullock, Jr.
(74) Attorney, Agent, or Firm—Mattingly, Stanger, Malur & Brundidge, P.C.

(57) ABSTRACT

A virtual computer system including a reallocation means, in which a plurality of LPAR are operated by logically dividing physical resources composing a physical computer exclusively or in time dividing manner so as to dynamically change reallocation of physical resources among each of LPARs. Based on load conditions measured by an application or an OS of each LPAR, physical resource allocation to each LPAR is determined, thereby conducting reallocation of LPAR.

8 Claims, 16 Drawing Sheets

20 MAIN MEMORY

| LPAR NAME | START ADDRESS | MAIN MEMORY SIZE | CPU ALLOCATION [%] ||||
|---|---|---|---|---|---|---|
| | | | CPU0 | CPU1 | ... | CPUn |
| LPAR0 | a | m1 | 100 | 50 | ... | — |
| ⋮ | | | | | | |
| LPARk | i | mk | — | 50 | ... | 100 |

100 LPAR INFORMATION TABLE

FIG. 7

CPU ALLOCATION (%)

|  | CPU0 | CPU1 | CPU2 | CPU3 |
|---|---|---|---|---|
| LPAR0 | 100 | 50 |  |  |
| LPAR1 |  | 50 | 100 |  |
| LPAR2 |  |  |  | 100 |

FIG. 8

CPU LOAD

| CPU OCCUPATION RATE (%)/QUEUE LENGTH | | | | |
|---|---|---|---|---|
|  | CPU0 | CPU1 | CPU2 | CPU3 |
| LPAR0 | 100/5 | 100/4 | — | — |
| LPAR1 | — | 10/0 | 5/0 | — |
| LPAR2 | — | — | — | 20/0 |

FIG. 9

NEW CPU ALLOCATION PLAN (%)

|  | CPU0 | CPU1 | CPU2 | CPU3 |
|---|---|---|---|---|
| LPAR0 | 100 | 75 | 50 | 30 |
| LPAR1 |  | 25 | 50 |  |
| LPAR2 |  |  |  | 70 |

900
REALLOCATION POLICY TABLE

FIG. 10

ACTION TABLE

| STATUS | PRIORITY | COUNTERMEASURE |
|---|---|---|
| OPU OCCUPTION RATIO IS HIGHER THAN IT'S THRETHOLD AND QUEUE LENGTH IS LONGER THAN IT'S THRESHOLD | 1 | INCREASE OF CPU ALLOCATION TIME AND ADDITION OF A CPU WHICH IS IN IDLING STATE |
| | 2 | ADDITION OF A CPU WHICH IS IN IDLING STATE |
| | 3 | INCREASE OF CPU |
| | ⋮ | |
| OPU OCCUPTION RATIO IS HIGHER THAN IT'S THRETHOLD AND QUEUE LENGTH IS NOT LONGER THAN IT'S THRESHOLD | 1 | ALLOCATION TIME |
| | 2 | ADDITION OF A CPU WHICH IS IN IDLING STATE |
| | ⋮ | |
| ⋮ | ⋮ | |

| CPU OCCUPATION RATIO (%) OF OFFERING LPAR | RATIO OF CPU ALLOCATION TIME TO BE RELEASED-FOR ANOTHER LPAR (%) |
|---|---|
| 0~10 | 50 |
| 10~20 | 40 |
| 20~30 | 30 |
| 30~40 | 20 |
| 40~ | 0 |

(CPU ALLOCATION TIME TO BE RELEASED)=(PRESENT CPU ALLOCATION TIME)
×(RATIO OF CPU ALLOCATION TIME TO BE RELEASED FOR ANOTHER LPAR)

CPU LOAD SAMPLING DATA OF AN LPAR

SPECTRUM OF CPU LOAD SAMPLING DATA

MEAN APPLICATION RESPONSE TIME

|  | MEAN RESPONSE TIME (sec.) |
|---|---|
| LPAR0 | 10 |
| LPAR1 | 2 |
| LPAR2 | 3 |

FIG. 22

| PRIORITY | COUNTERMEASURES |
|---|---|
| 1 | INCREASE OF CPU ALLOCATION RATIO |
| 2 | INCREASE OF NUMBER OF CPUs |
| 3 | INCREASE OF MAIN MEMORY ALLOCATION |
| 4 | INCREASE OF SWAP AREA OF DISK |
| ⋮ | ⋮ |

FIG. 24

| AGREEMENT CLASS 1000 | AGREEMENT FEE 1001 |
|---|---|
| A | PA |
| B | PB |
| C | PC |

FIG. 25

| AGREEMENT CLASS 1000 | AGREEMENT FEE 1002 | UPPER THRESHOLD 1003 | LOWER THRESHOLD 1004 |
|---|---|---|---|
| A | 1 | UTA | LTA |
| B | 2 | UTB | LTB |
| C | 3 | UTC | LTC |

FIG. 26

| CUSTOMER 1005 | CUSTOMER'S AGREEMENT CLASS 1006 | USING LPAR 1007 |
|---|---|---|
| C0 | B | LPAR0 |
| C1 | A | LPAR1 |
| C2 | C | LPAR2 |
| C3 | C | LPAR3 |

VIRTUAL COMPUTER SYSTEM WITH DYNAMIC RESOURCE REALLOCATION

BACKGROUND OF THE INVENTION

1. Field of Invention

The present invention relates to a virtual computer system, in particular, to a technique for dynamically reallocating a resource for a virtual computer corresponding to a load of the virtual computer.

2. Description of Related Art

In a virtual computer system, physical resources such as a CPU, a main memory, and an IO are logically partitioned and allocated to each virtual computer LPAR (Logical Partition) realized on the virtual computer system. Mechanisms which allocate physical resources to a virtual computer dynamically in a virtual computer system are disclosed in Japanese Laid-Open Patent Publications No. 6-103092 and No. 6-110715. In the virtual computer system disclosed in the above-mentioned publications, when allocation of physical resources of LPAR is to change, operation by an operator or time driven (to drive when a timer reaches a set time) issues a re-allocation demand to a program (hypervisor) for controlling a whole virtual computer system. The hypervisor dynamically changes the allocation of LPAR according to a resource allocation method configured before the operator issues the reallocation demand.

Moreover, the hypervisor also includes a monitoring function for collecting a system operation condition such as a CPU time of each LPAR. In these devices, operators need to decide allocation of physical resources, and after allocating resources automatically from the system operation condition, it is not possible to automatically re-allocate them. However, according to Japanese Laid-Open Patent Publication No. 9-26889, a device is suggested in which one LPAR inquiries a hypervisor about CPU time of another LPAR within the same virtual computer system, and when there is a difference between the actual CPU time and set allocated CPU time, the allocated CPU time is matched with the actual CPU time. However, the CPU time does not always representing a load condition of the computer system correctly. Moreover, it is difficult to improve a response property of the system by simply increasing the CPU time.

SUMMARY OF THE INVENTION

Unlike such simple case, there is not suggested a method for automatically adjusting physical resources of a computer according to a load of the computer other than the CPU time such as corresponding time in applications, namely, a web server or an application server. There are provided examples of good aspects of allocating resources automatically. When a computer is used for a purpose of a data center (in which, a server for the Internet business is set up for undertaking its management), the number of computers to manage becomes extremely large. If physical resources can be increased or decreased automatically according to a load of each LPAR so as to use the physical resource of the virtual computer system effectively, it would be effective in term of reduction of the management cost, as well as a performance guarantee of the system.

In view of above, it is an object of the present invention to provide a virtual computer system which performs re-allocation of LPAR corresponding to a load condition of the LPAR observed by operating systems or applications of the virtual computer system.

In order to achieve the above-described object, in one aspect of the present invention, a virtual computer system including methods of: operating a plurality of LPAR on a physical computer; dynamically re-allocating physical resources such as CPU or a main memory between each LPAR by a hypervisor; measuring a load of the system such as a swap frequency of the main memory, a length of queue for execution of process, and a CPU occupation rate of each LPAR, and process corresponding time of the application program, in which, based on the load of the LPAR measured by the measuring method, resource reallocation for LPARs is conducted by changing an amount of physical resources to be allocated for each LPAR.

BRIEF DESCRIPTION OF THE DRAWINGS

FIG. 7 is a diagram illustrating a table for regulating a CPU allocation rate for every LPAR according to the above-described embodiment, FIG. 8 is a diagram illustrating a table showing a load condition of CPU for every LPAR according to the above-described embodiment, FIG. 9 is a diagram illustrating reallocation policy table according to the above-described embodiment, FIG. 10 is a diagram illustrating an action table according to the above-described embodiment, FIG. 22 is a diagram illustrating a chart showing a dealing content with respect to a load condition according to another embodiment of the present invention, FIG. 24 is a diagram illustrating correspondence between agreement fee and agreement class of a user at a data center, FIG. 25 is a diagram illustrating correspondence among an agreement class, priority, upper load threshold and lower load threshold, FIG. 26 is a diagram illustrating correspondence among a customer, a customers agreement class, and an occupation LAPR.

DETAILED DESCRIPTION OF PREFERRED EMBODIMENT

In embodiments of the present invention, the following process is conducted.

Embodiment includes methods of: operating a plurality of LPAR on a physical computer; dynamically re-allocating physical resources such as CPU or a main memory between each LPAR by a hypervisor; measuring process corresponding time of the application program and a load of the system such as a swap frequency of the main memory, a length of queue for execution of process, and a CPU occupation rate of each LPAR, in which, based on the load of the LPAR measured by the measuring method, resource reallocation for LPARs is conducted by changing an amount of physical resources to be allocated for each LPAR.

Moreover, as an OS operated on the LPAR, the OS having a function of dynamically changing the number of CPUs at the time of operation and changing the maim memory amount is used so as to conduct reallocation of the LPAR corresponding to the number of the CPUs or the main memory amount according to the load of the LPAR.

Moreover, in order to realize more effective allocation of the physical resources, a load of each LPAR after re-allocation is measured to determine if the load of LPAR, which was high before the reallocation, becomes low. In a case where the reallocation is not effective, by putting the allocation back to pre-reallocation state, reallocation of the LPAR appropriately is conducted.

Likewise, for effective reallocation of the physical resources, changes in the load of the virtual computer are monitored. When periodical load changes is observed, the physical resources of the CPU allocation time or the number of the CPUs and the like is increased at the time of the high load state, while allocating the physical resources to another high load LPAR at the time of low load state, so as to change the load condition according to the configuration periodically.

Below, with reference to the drawings, examples of a virtual computer system according to the present invention will be described.

Figure 2:
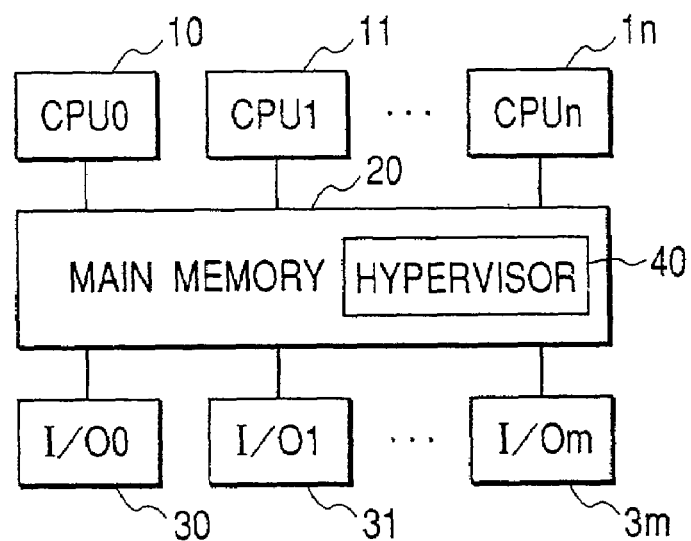
FIG. 2 is a diagram illustrating a configuration example of a physical computer system composed of one virtual computer system according to all embodiments of the present invention.

FIG. 2 shows a physical computer system configuration composing a virtual computer system which is common to all embodiments of the present invention. There may be a plurality of the physical computer systems. FIG. 2 shows a tightly coupled multiprocessor which is the physical computer composing the virtual computer system. Reference numerals 10, 11 . . . , and 1$n$ respectively denotes CPU0, CPU1, . . . , and CPUn. Reference numeral 20 denotes a main memory device. Reference numerals 30, 31, . . . 3$m$ respectively denotes I/O device I/O0, I/O1, . . . I/Om. Reference numeral 40 denotes a hypervisor which controls the whole virtual computer system by residing in the main memory.

Figure 3:
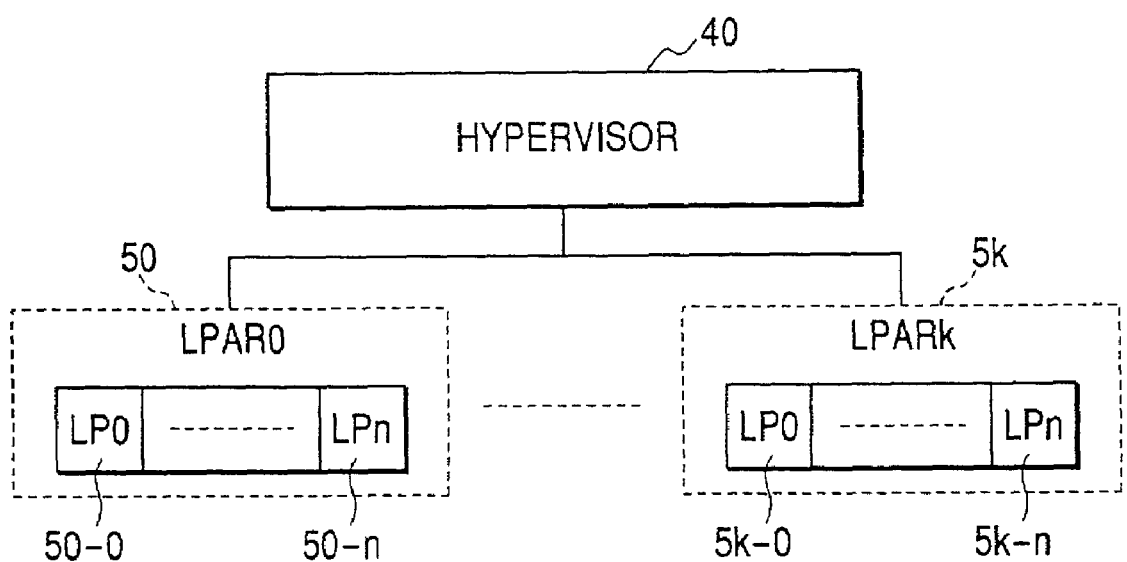
FIG. 3 is an overview illustrating a virtual computer system according to embodiments of the present invention.

FIG. 3 shows an overview of a virtual computer system. What is shown in FIG. 3 is one virtual computer system corresponding to the physical computer system shown in FIG. 2. Reference numeral 40 denotes the hypervisor. Reference numerals 50, . . . , and 5$k$ denote virtual computers LPAR0, . . . LPARk. Reference numerals 50-0, . . . , and 50-$n$ denote logical pressors LP0, . . . , and LPn contained in the LPAR0, and reference numerals 5$k$-0, . . . , and 5$k$-$n$ denote logical processors LP0, . . . , and LPn contained in the LPARk. Each LPAR includes a plurality of logical processors LP because a physical configuration is a multiprocessor system.

Figures 4, 5:
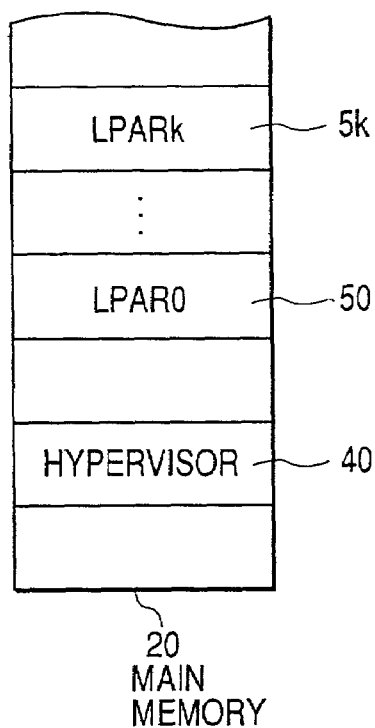
FIG. 4 is a diagram illustrating area allocation of a main memory device according to embodiments of the present invention.
FIG. 5 is a diagram illustrating LPAR information table according to embodiments of the present invention.

FIG. 4 shows an overview of the main memory device 20. In the main memory device 20, there are areas allocated to the hypervisor and each LPAR.

FIG. 5 shows an LPAR information table 100. The LPAR information table 100 shows allocation of physical resources of each LPAR. Reference numeral 101 denote a field showing a name of LPAR, reference numeral 102 denotes a field showing a start address of the area of on the main memory device which is allocated to each LPAR, and reference numeral 103 denotes a field defining a physical main memory capacity of each LPAR. Reference numeral 104 denotes a field defining percentage of allocated CPU time which is allocated to each LPAR. Based on the percentage of allocated CPU time, the hypervisor 40 allocates CPU10, . . . , and CPU1$n$ to LPAR0, . . . , and LPARk in time divided manner.

Figure 6:
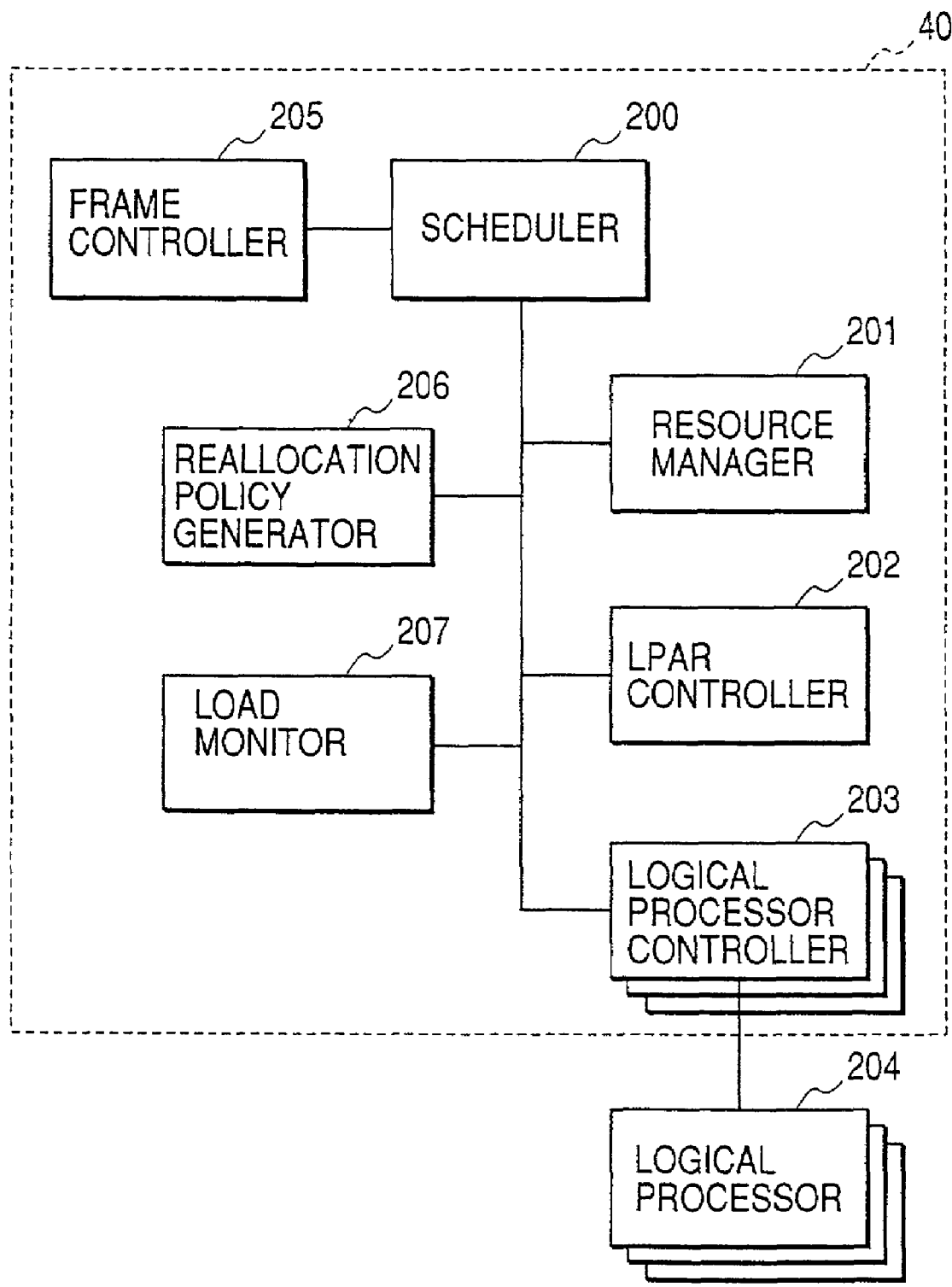
FIG. 6 is a diagram illustrating a configuration of a hypervisor according to embodiments of the present invention.

FIG. 6 shows a configuration of the hypervisor. The hypervisor 40 is composed of: a scheduler 200 for scheduling each LPAR; a resource manager 201 for managing physical resources allocated to each LPAR; an LPAR controller 202 for controlling operation commands and the like to each LPAR; a logical processor controller 203 for controlling a logical processor 204 in which an operating system of each LPAR is conducted; a frame controller 205 for controlling a frame as a screen of a system console for inputting information for an operator to operate the LPAR, and a frame as a screen having information notifying the operator about a condition of the LPAR; a reallocation plan controller 206 for planning allocation of physical resources of the LPAR; and a load monitor 207 for monitoring a condition of a load applied to each LPAR.

Below, operation of the virtual computer system according to the present invention will be described by taking an example of a case where three LPARs are operated on the physical computer having four CPUs. Herein, it is assumed that a CPU is time shared or used exclusively according to the allocation shown in FIG. 7. Specifically, CPU0 is used by 100% by the LAPR0, CPU1 is used 50% by the LPAR0 and 50% by the LPAR1, and CPU2 and CPU3 are used 100% respectively by the LPAR1 and LPAR2.

Figure 15:
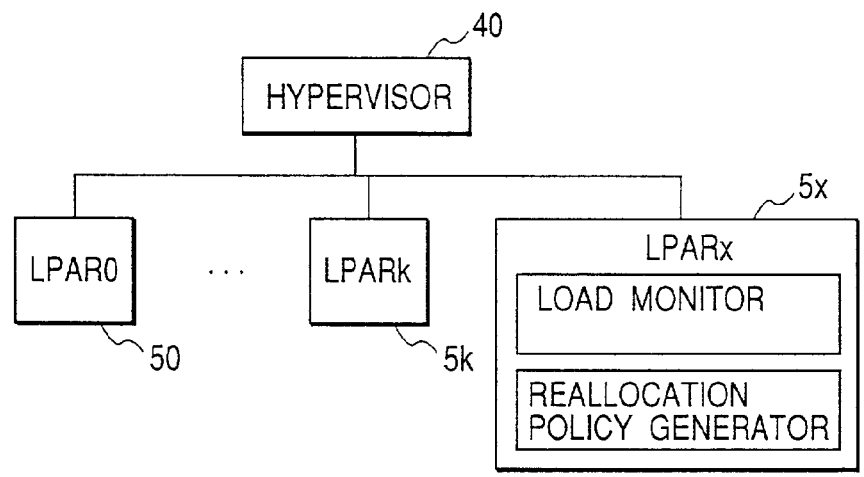
FIG. 15 is a diagram illustrating a mounting example of a policy server according to the embodiments.
Figure 16:
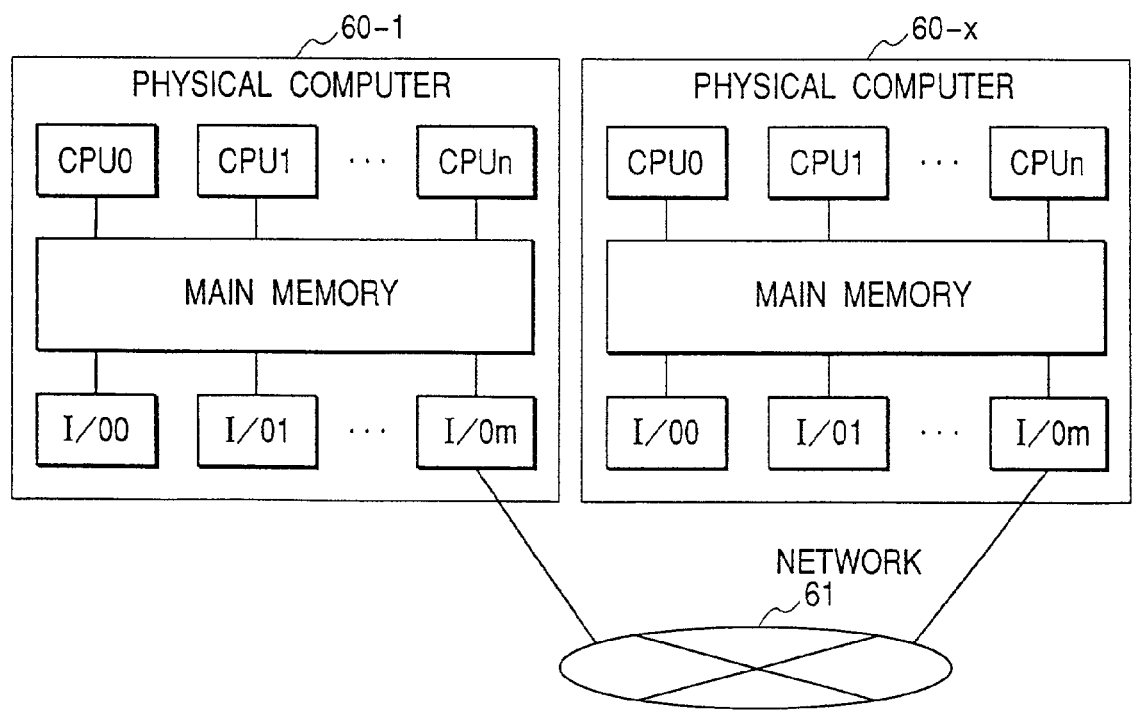
FIG. 16 is a diagram for illustrating another mounting example of a policy server.

The reallocation policy controller 206 and the load monitor 207 according to the present invention are not limited to be mounted as a part of the hypervisor, and alternatively, they may be mounted as a user program operated on an operation system. Hereinafter, a computer, in which a program having functions as the reallocation policy controller 206 and the load monitor 207 is operated, is called a policy server. The policy server, as shown in FIG. 15, may be a specific LPAR5x on the virtual computer system operating LPAR50, . . . , and LPAR5k which is a examination target regarding the load condition. Moreover, as shown in FIG. 16, in physical computers 60-1 and 60-x connected by a network, a policy server for measuring a load of LPAR operated on the physical computer 60-1 may be mounted on the physical computer 60-x. In the physical computer 60-x, either single OS or a plurality of LPAR may be operated. The LPAR5k or the physical computer 60-x is not exclusive for the policy server, but may conduct other application processes.

A description for the system configuration as a condition for embodiments of the present invention has finished as above, and each embodiment will now be described in detail.

Embodiment 1

Figure 1:
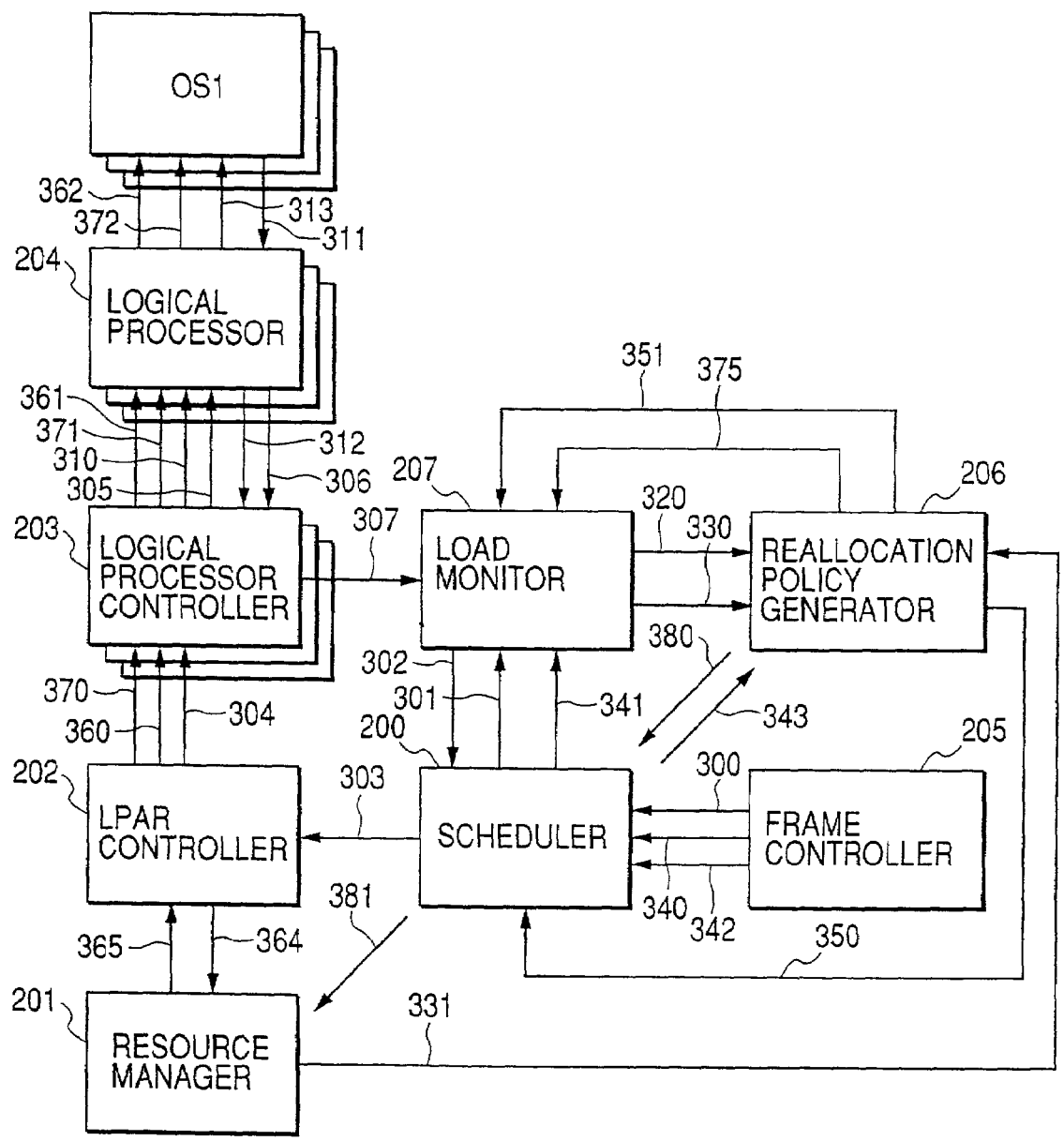
FIG. 1 is a diagram illustrating a first embodiment of the present invention.

Hereinbelow, referring to FIG. 1, a process flow will be described, in which a load condition of LPAR measured by the OS on each LPAR is examined and dynamically reallocated. The term "load condition" as used herein means a length of queue for execution of process or a CPU occupation rate.

An operator of a virtual computer system sets, in a frame, a demand for examining a load condition of LPAR and time interval of the examination of the load. The frame controller 205 notifies the load monitor 207 of a monitoring demand and a monitoring interval of the LPAR load condition through the scheduler 200 (300, 301). Then, the load monitor 207 notifies the LPAR controller 2020 of a load condition examination demand (302, 303) through scheduler 200. The LPAR controller 202 examines a load condition of each logical processor 204 with respect to each logical processor controller 203 (305),and issues a demand (304) for transferring the examination results (306, 307) to the load monitor 207. The load monitor 207 saves the load condition of each LPAR inside thereof. A saved amount of the load condition information is directed by the operator to the frame controller 205 through the frame so as to notify the load monitor 207 of the amount through the scheduler 200.

In the present embodiment, as a numerical value to express a load condition, the CPU occupation rate and the length of queue for execution of process are used, the length of queue for execution of process being the number of processes waiting to be executed. The term "CPU occupation rate" as used herein means percentages of time that an LPAR actually occupies as opposed to allocated CPU time to the LPAR. FIG. 8 shows an example of a load condition of each LPAR. This shows each CPU occupation rate and a length of queue for execution of process of task or thread for every LPAR. A demand 310 collecting the information is notified to the logical processor controller 203 of each LPAR from the LPAR controller 202. The logical processor controller 203 interrupts to the OS1 operating on each LPAR through the logical processor 204. Then, from a counter regarding an operation state of the OS1, acquisition of information about the CPU occupation rate and the length of queue for execution of process is demanded (313) so as to acquire load condition information (311, 312). The logical processor controller 203 transfers the examination result (306, 307) to the load monitor 207.

Generally, it may be considered that the higher CPU usage and the longer length of queue for execution of process, the larger the load condition of the system. Accordingly, in the load monitor 207, an average load condition is calculated for a certain period of time (for one hour, for example), and when it exceed a threshold set at the frame by the operator, a reallocation demand of each LPAR is issued against the reallocation policy generator 206 (320).

The reallocation policy generator 206 read the load condition of each LPAR from the load monitor 207 (330), and the current CPU allocation toward each LPAR is read from the resource manager 201 (331). Next, the reallocation policy generator 206 generates inside a reallocation policy table 900 (FIG. 9) from the current CPU allocation and the load condition. This shows a condition in which, from the current CPU allocation stored in the resource manager 201 shown in FIG. 7, LPAR0 identifies that a load of CPU is high so that the CPU allocation to the LPAR0 is increased.

A policy of reallocation differs depending upon what is observed amongst the load information of the system. If CPU is a problem, it is possible to form a policy to increase the allocation time of CPU or increasing the number focus. Moreover, a policy differs depending on whether or not the OS operating on each LPAR has a function of increasing and decreasing the number focus at a time of start up. There are two kinds of OS: one is the OS enables to activate a new CPU without terminating the OS; and the other is the OS in which operation of the OS has to reset once to reallocate thereafter so as to change the number of CPUs for activation. If an OS is unable to increase/decrease the number of CPUs at the time of activation, only option is to change the CPU allocation time. However, if the OS can change the number of CPU at the time of OS activation, it is possible to change the number of CPUs as well as the CPU allocation time. In the present embodiment, an OS with a function of reallocating the number of CPUs at the activation is used. Moreover, when an OS, which can change the main memory capacity at the time of OS activation, is used, as a load condition, frequency of paging of the main memory (rewriting of a page on actual memory) or swap (swapping of application programs) is examined, and if the frequency is high, it is possible to form a policy to increase the main memory amount. In the present embodiment, an example is shown, in which reallocation of each LPAR is conducted based on the load condition of the CPU.

Inside the reallocation policy generator 206, there is a table (FIG. 10) in which correspondence actions is provided with respect to: a type of load observed, a threshold which is identifies as a heavy load, a priority of load to be dealt with, and a case of a high load. This table is set by the operator at the table, and notifies, from the frame controller 205 to the reallocation policy generator 206 via the scheduler 200, about that writing has been done (304, 341). The reallocation policy generator 206 receives the notification, read data in the frame controller 205 (342, 343), and write in the correspondence table inside the reallocation policy generator 206.

Figures 11, 12:
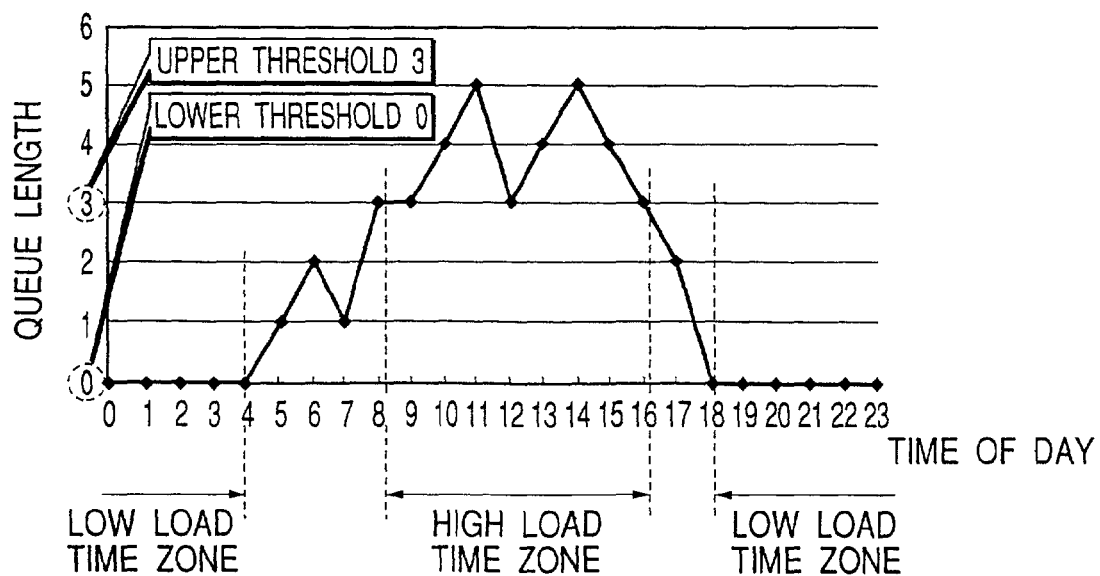
FIG. 11 is a diagram illustrating a CPU allocation time comparison table according to the above-described embodiment.
FIG. 12 is a diagram illustrating an average CPU load of a LPAR according to yet another embodiment of the present invention.

In the present embodiment, based on the action table shown in FIG. 10, the CPU allocation time is increased because of high the CPU occupation rate of the LPAR0, and the number of simultaneously executable processes is increased by increasing the number of the CPUs allocated to the LPAR0 because of long queue for execution of process, thereby reducing the load. In order for such a transfer of physical resources not to cause deterioration of performance of less loaded LPAR, a method is applied, in which for every average CPU occupation ratio as shown in FIG. 11, for example, less loaded LPAR offers certain percentages of the CPU time to another heavily loaded LPAR so as to allocate it therefor. In FIG. 11, the less the current CPU occupation ratio of a LPAR is, the more ratio is allocated to the other LPAR. Herein, even if a current CPU occupation ratio is low for one LPAR, by allocating most or all of the CPU allocation to. another LPAR, an increase of load to the LPAR is prevented. The reallocation policy in the reallocation policy table 900 as shown in FIG. 9 is formed base on this allocation.

The reallocation policy generator 206 issues a reallocation demand to the scheduler 200 (350). At the same time, it issues, to the load monitor 207, a demand to stop measuring performance (351).

In terms of a reallocation procedure for a LPAR, it is conventionally conducted by operation of the operator or time divided scheduling. However, in the present invention, it is conducted by the hypervisor which issues the reallocation demand at an event that the load to the system exceeds the threshold.

First, the scheduler 200 reads the reallocation policy table 900 in FIG. 9 inside the reallocation policy generator 206 (380). Then, it rewrites a LPAR information table inside the resource manager 201 (381) so as to direct allocation change to each LPAR controller 202.

The LPAR controller 202 stops the OS1 of the logical processor 204 which belongs to the LPAR to be reallocated (360, 361, 362). Next, the LPAR controller 202 issues a demand to read the LPAR information table of the resource manager 201 (364). The allocation that has just been read (365) is stored inside the LPAR controller 202.

The LPAR controller 202 instructs, to each logical processor controller 203, re-operation of the OS to the logical processor 204 (370, 371, 372). After rebooting the OS1, the LPAR controller notifies the reallocation policy generator 206 and the load monitor 207 of completion of LPAR reallocation (375). The load monitor 207 issues a demand to examine a load condition of a LPAR to the LPAR controller 202 as described above (302, 303). With the processes above, a change of resource allocation is completed.

When the time divided CPU allocation time is changed, the scheduler 200 only needs to execute a newly defined CPU allocation time, so that the allocation change is completed by the process in the hypervisor. If a new CPU (logical processor) is to be added, the LPAR controller 202 notifies the OS on a LPAR, directly or via the logical processor controller 203, of a newly allocated CPU (logical processor) by interruption or the like. Thereby, the OS on the LPAR sends to the corresponding LPAR controller 202 a command to boot the newly added CPU (logical processor) spontaneously.

As described above, by acquiring the CPU occupation rate and/or the length for execution of process from the OS of the LPAR, resource allocation, such as the CPU allocation time or the main memory capacity, is changed. Thereby, it is possible to accurately comprehend a degree of the LPAR load rather than measuring the CPU time. Moreover, it is possible to allocate more resource to LPAR having a higher load without sequential command from the operator.

Embodiment 2

Figure 17:
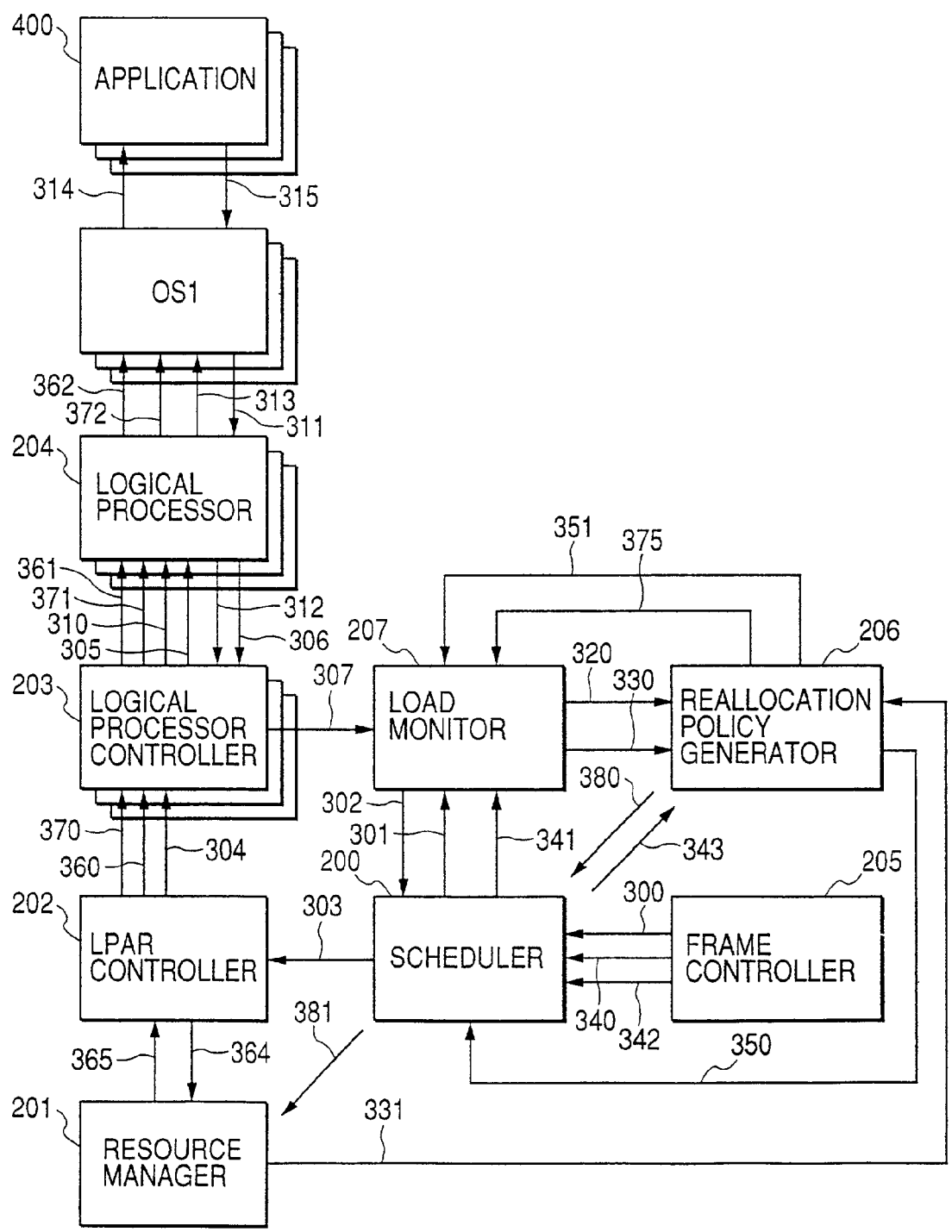
FIG. 17 is a diagram illustrating yet another embodiment of the present invention.

Hereinbelow, by using FIG. 17, process flow is described below, the process being from examination of a load condition of application operating on the LPAR to dynamic reallocation. The load condition of the application used herein is a response time of the application program process. For example, it means the response time of a transaction process such as retrieving a table from a data base so as to update contents of the table.

An operator of the virtual computer system requests to examine the load condition of the LPAR in a frame, and set a time interval to be examined. The frame controller 205 notifies the load monitor 207 of a monitoring demand and a monitoring interval about the LPAR load condition through the scheduler 200 (300, 301). Then, the load monitor 207 notifies the LPAR controller 202 of a load condition examination demand (302, 303) through the scheduler 200. The LPAR controller 202 examines a load condition of each logical processor 204 with respect to each logical processor controller 203 in the set monitoring interval(305), and issues a demand (304) to transfer the examination results (306, 307) to the load monitor 207. The load monitor 207 saves the load condition of each LPAR inside thereof. A saved amount of the load condition information is directed by the operator to the frame controller 205 through the frame so as to notify the load monitor 207 of the amount through the scheduler 200.

A demand 310 to collect the load condition of the application is notified to the logical processor controller 203 of each LPAR from the LPAR controller 202. The logical processor controller 203 sends an interruption signal to the logical processor 204 and the OS1. From the OS1, a signal to demand for the load condition information of an application 400 is sent to the application 400 (313, 314). The load condition of the application 400 is transferred to the load monitor 207 through the logical processor controller 203 (315, 311, 312). Moreover, not only the response time of the application, but also the CPU load condition as shown in Embodiment 1 is transferred to the load monitor 207 at the same time.

Figures 18, 19:
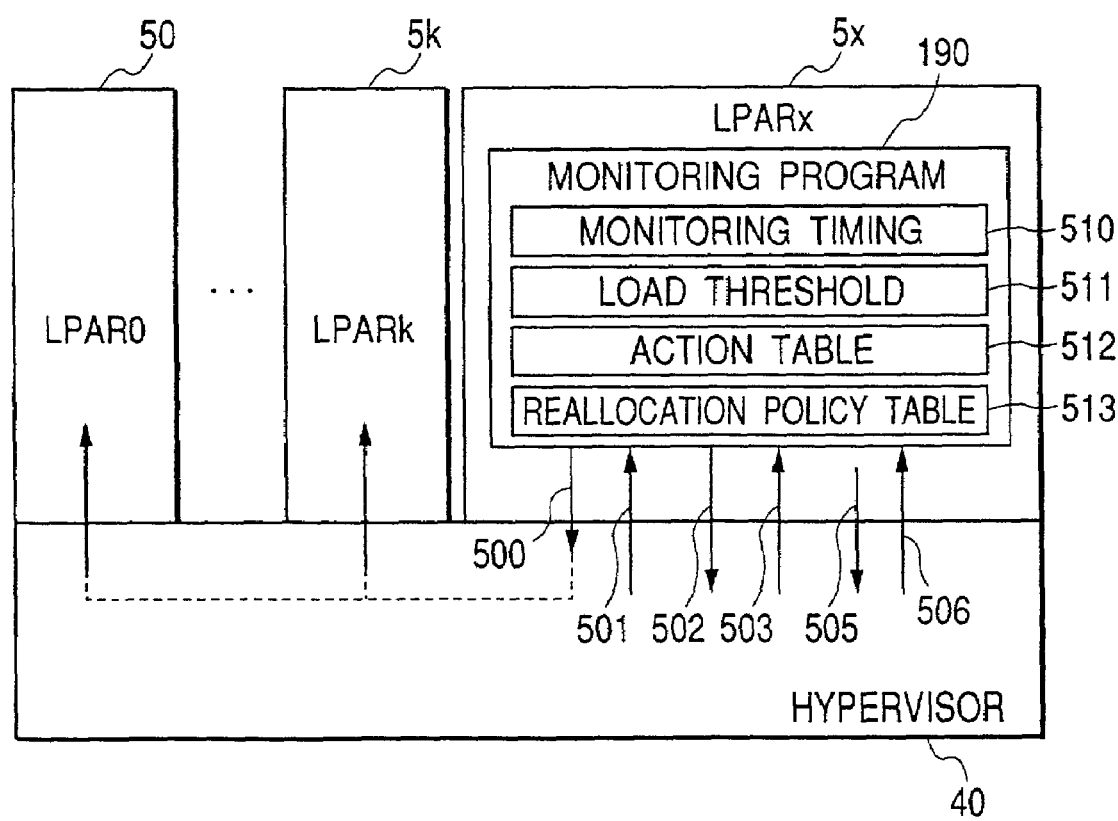
FIG. 18 is a diagram illustrating an application average response time table for every LPAR according to the above-described embodiment.
FIG. 19 is a diagram illustrating another mounting example of a reallocation policy generator and a load condition monitoring circuit according to another embodiment of the present invention.

In the load monitor 207, an average load condition is calculated for a certain period of time (for one hour, for example) (FIG. 18). By providing a measuring means for measuring a time from receiving a transaction to the application program until the completion thereof, the response time is measured. When it exceeds a threshold set at the frame by the operator, a reallocation demand of each LPAR is issued to the reallocation policy generator 206 (320). For example, if a threshold of the response time is 5 seconds, according to the response time distribution as shown in FIG. 18, the reallocation of the physical resources of the LPAR0 is conducted so as to improve its performance.

The reallocation policy generator 206 reads the load condition of each LPAR from the load monitor 207 (330), and the current CPU allocation toward each LPAR is read from the resource manager 201 (331). Next, the reallocation policy generator 206 generates inside a reallocation policy table 900 (FIG. 9) from the current CPU allocation and the load condition. Inside the reallocation policy generator 206, there is a table (FIG. 10) in which correspondence actions is provided with respect to: a type of load observed, a threshold which is identifies as a heavy load, a priority of load to be dealt with, and a case of a high load. This table is set by the operator at the table, and notifies, from the frame controller 205 to the reallocation policy generator 206 via the scheduler 200, about that writing has been done (340, 341). The reallocation policy generator 206 receives the notification, read data in the frame controller 205 (342, 343), and write in the correspondence table inside the reallocation policy generator 206.

The reallocation policy becomes different depending on observed information in the load condition of the system. In the present embodiment, from distribution of the CPU time, CPU allocation time to be added to the LPAR0 is calculated, i.e., conduct a similar process in Embodiment 1.

First, based on the action table shown in FIG. 10, the CPU allocation time is increased because of high CPU occupation rate of the LPAR0, and the number of simultaneously executable processes is increased by increasing the number of the CPUs allocated to the LPAR0 because of long queue for execution of process, thereby taking an action to reduce the load. In order for such a transfer of physical resources not to cause deterioration of performance of less loaded LPAR, a method is applied, in which for every average CPU occupation ratio as shown in FIG. 11, for example, less loaded LPAR offers certain percentages of the CPU time to another heavily loaded LPAR so as to allocate it therefor. FIG. 9 is a table having the reallocation policy formed therein based on the allocation described above.

The reallocation policy generator 206 issues the reallocation demand to the scheduler 200 (350). Simultaneously, it issues a demand to stop measuring performance to the load monitor 207 (305).

In terms of a reallocation procedure for a LPAR, it is conventionally conducted by operation of the operator or time divided scheduling. However, in the present invention, it is conducted by the hypervisor which issues the reallocation demand at an event that the load to the system exceeds the threshold.

First, the scheduler 200 reads the reallocation policy table inside the reallocation policy generator 206. Then, it rewrites a LPAR information table inside the resource manager 201 so as to direct allocation change to each LPAR controller 202.

The LPAR controller 202 stops the OS1 of the logical processor 204 which belongs to the LPAR to be reallocated (360, 361, 362). Next, the LPAR controller 202 issues a demand to read the LPAR information table of the resource manager 201 (364). The allocation that has just been read (365) is stored inside the LPAR controller 202.

The LPAR controller 202 instructs each logical processor 203 to re-operate OS of the logical processor 204 (370, 371, 372). After re-booting the OS1, the LPAR controller notifies the reallocation policy generator 206 and the load monitor 207 of completion of reallocation of the LPAR (375). The load monitor 207 issues an examination demand of the load condition of the LPAR to the LPAR controller 202 as described above (302, 303). With the above-described process, change of resource allocation is completed.

When the time divided CPU allocation time is changed, the scheduler 200 only needs to execute a newly defined CPU allocation time, so that the allocation change is completed by the process in the hypervisor. If a new CPU (logical processor) is to be added, the LPAR controller 202 notifies the OS, on a LPAR directly or via the logical processor controller 203, of a newly allocated CPU (logical processor) by interruption or the like. Thereby, the OS on the LPAR sends to the corresponding LPAR controller 202 a command to boot the newly added CPU (logical processor) spontaneously. As such, the reallocation is completed. Then, the load monitor 207 restart monitoring load conditions of each LPAR again.

As described above, from the duration of the response time in the application program, a degree of the load of CPU is identified so as to conduct resource allocation. Thereby, it is possible to comprehend if the operation condition of load is large or not.

Embodiment 3

The present embodiment is an example of a system, in which the reallocation policy generator 206 and the load monitor 207 are mounted to a program operating on a certain LPAR provided in the same virtual computer system according to Embodiment 2.

FIG. 19 shows a configuration of the present embodiment. A monitoring program 190 to be executed on LPAR5x issues reallocation demand of physical resources and monitoring of the load condition of LPAR50, . . . , LPAR5k.

The monitoring program 190 on the LPAR5x transfers the load condition examination demand to each LAPR50, . . . LPAR5k. At that time, as a communication method, the following is known as shown in Japanese Laid-Open Patent Publication No. 10-301795: a method for emulating the communication virtually by a hypervisor; a method using an IO channel; and a method using CPUs within LPARs whereas using channel to communicate with a computer outside the LPAR. In terms of a communication method between LPARs, any method can be applied, but in the present embodiment, the method, in which the hypervisor emulates the communication path between LPARs, is used.

(Acquisition of the Load Condition)

The monitoring program 190 demands load conditions of other LPAR50, . . . , LPAR5k (500). Each LPAR receiving the demand transfers load information (the CPU occupation rate, a length of queue for execution of process as in Embodiment 1, and a process response time of an application as in Embodiment 2) to the LPAR5x (501). An issuing timing 510 of the load condition examination demand 500 is set in the monitoring program 190 by an operator.

(Issue of the Reallocation Demand)

Similar to the load monitor 207 of Embodiment 1, the operator sets threshold 511 of a load in advance, which is held inside the monitoring program 190. When a load exceeding the threshold 511 is monitored, the monitoring program 190 issues a demand for notification of the current resource allocation to the hypervisor 40 (502), and receives the resource allocation information to the hypervisor 40 (503). A load action table 512 describes combination of modifying policy about allocation such as the load condition and the CPU allocation time or the number of CPUs, and it is set by the operator in the monitoring program 190. The load action table 512 and an allocation policy table 513 are generated, the allocation policy table 513 showing a new resource allocation policy from the load condition. The reallocation policy table 513 is generated by the method shown in Embodiment 1, description thereof is omitted in the present embodiment.

Next, the monitoring program 190 issues the reallocation policy table 513 and the reallocation demand 505 to the hypervisor 40, the reallocation demand including a command for demanding reallocation of allocated resources to the LPAR50, . . . , LPAR5k. The hypervisor 40 transfers the reallocation completion acknowledgment 506 to the monitoring program 190 after completion of reallocation. As described above, reallocation of the LPAR reflecting the load condition is completed. Thereafter, the monitoring program 190 restart monitoring of the load condition of each LPAR.

The above description shows the system having the reallocation policy generator 206 and the load monitor 207 mounted on the monitoring program operating on the certain LPAR provided in the same virtual computer system. According to the system, even if algorithm of the reallocation policy is set to be changed freely, the algorithm does not exist in the hypervisor, and thus, it is not necessary to enable the hypervisor, a core of the system, to be operable for the operator. Therefore, there is no need to worry about a security problem or an operation by the operator which may cause trouble to the hypervisor. Moreover, even if malfunction has occurred to the reallocation policy, by setting the hypervisor to monitor unreasonable process, malfunction to the whole system cannot be generated.

Embodiment 4

The present embodiment is an example of a system, in which the monitoring program 190 operating on the certain LPAR provided in the same virtual computer system in Embodiment 3 is mounted on another physical computer.

Figure 20:
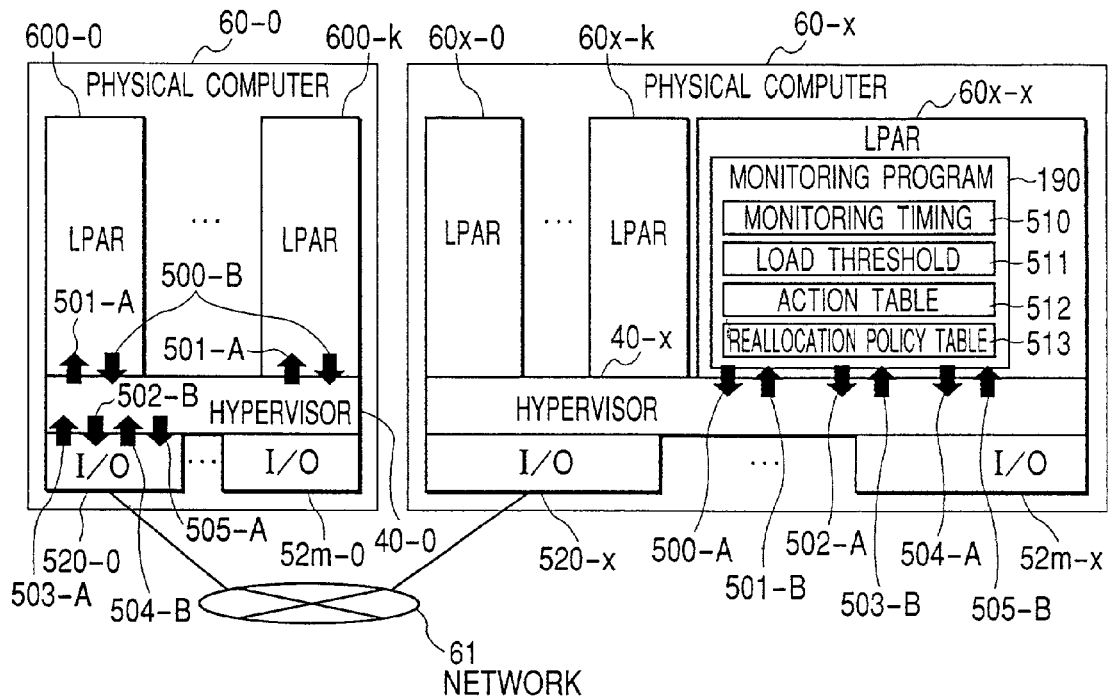
FIG. 20 is a diagram illustrating another mounting example of a reallocation policy generator and a load monitor according to another embodiment of the present invention.

FIG. 20 shows a configuration of the present embodiment. The monitoring program 190 executing on LPAR60x-x on a physical computer 60-x issues a reallocation demand of physical resources and monitoring of load conditions of LPAR600-0, . . . , LPAR600-k of a physical computer 60-0.

The monitoring program 190 on the LPAR60x-x issues the load condition examination demand 500-A to the physical computer 60-0. A hypervisor 40-0 of the physical computer 60-0 transfers the load condition examination demand to each of the LAPR600-0, . . . , LPAR600-k. The hypervisor 40-0 (40-x) on the physical computer 60-0 (60-x) communicates with another physical computer 60-x (60-x) by using the IO channel. In the present embodiment, the monitoring program 190 is mounted as a program on the LPAR. Alternatively, on the physical computer 60-x, single computer may be operated instead of the virtual computer system. Specifically, LPAR60x-x may be a single physical computer.

(Acquisition of the Load Condition)

The monitoring program 190 demands load conditions of LPAR600-0, . . . , LPAR600-k mounted on another physical computer 60-0 through I/0520-x (500-A, 501-A). Each LPAR receiving the demand transfers load information (the CPU occupation rate, a length of queue for execution of process as in Embodiment 1, and a process response time of an application as in Embodiment 2) to the LPAR60x-x (500-B, 501-B). An issuing timing 510 of the load condition examination demands 500-A and 500-B is set in the monitoring program 190 by the operator.

(Issue of the Reallocation Demand)

Similar to the load monitor 207 of Embodiment 1, the operator sets threshold 511 of a load in advance, which is held inside the monitoring program 190. When a load exceeding the threshold 511 is monitored, the monitoring program 190 issues a demand to notify the hypervisor 40-0 of the current resource allocation (502-A), and receives the resource allocation information from the hypervisor 40-0 (502-B, 503-B). A load action table 512 describes combination of modifying policy about allocation such as the load condition and the CPU allocation time or the number of CPUs, and it is set by the operator in the monitoring program 190. The load action table 512 and an allocation policy table 513 are generated, the allocation policy table 513 showing a new resource allocation policy from the load condition. Since the reallocation policy table 513 is generated by the method shown in Embodiment 1, description thereof is omitted in the present embodiment.

Next, the monitoring program 190 issues the allocation demands 504-A, 504-B including a command to demand of reallocation of resources allocated to the LPAR600-0, . . . , LPAR600-k on a physical computer 60-0 and the reallocation policy table 513 to the hypervisor 40-0. The hypervisor 40-0 transfers the reallocation completion acknowledgment 505-A and 505-B to the monitoring program 190 after completion of reallocation. As described above, reallocation of LPAR which reflects the load condition is completed. Then, the monitoring program 190 restart monitoring load conditions of each LPAR.

As described above, the example in which the monitoring program mounted on the other physical computer is shown. Accordingly, there is an effect that makes it possible to conduct integrated management of the other physical computers having LPARs mounted therein.

Embodiment 5

In Embodiment 2, in order to examine the response time of application programs, interruption to OS is generated from the hypervisor, and the OS sent a signal to the application program so as to demand response time of the process measured by the application program. Alternatively, in the present invention, referring now to FIG. 21, a method for examining load conditions of the application program operated on the LPAR without having particular interface with respect to the application program will be described. Herein, the application program does not measure response time. Or even if it measures the response time, there is no interface to read out. After examining the load condition of the application, a procedure of changing physical resource allocation of the application follows that of Embodiment 4, and thus, description of the LPAR reallocation is omitted in the present embodiment.

Figure 21:
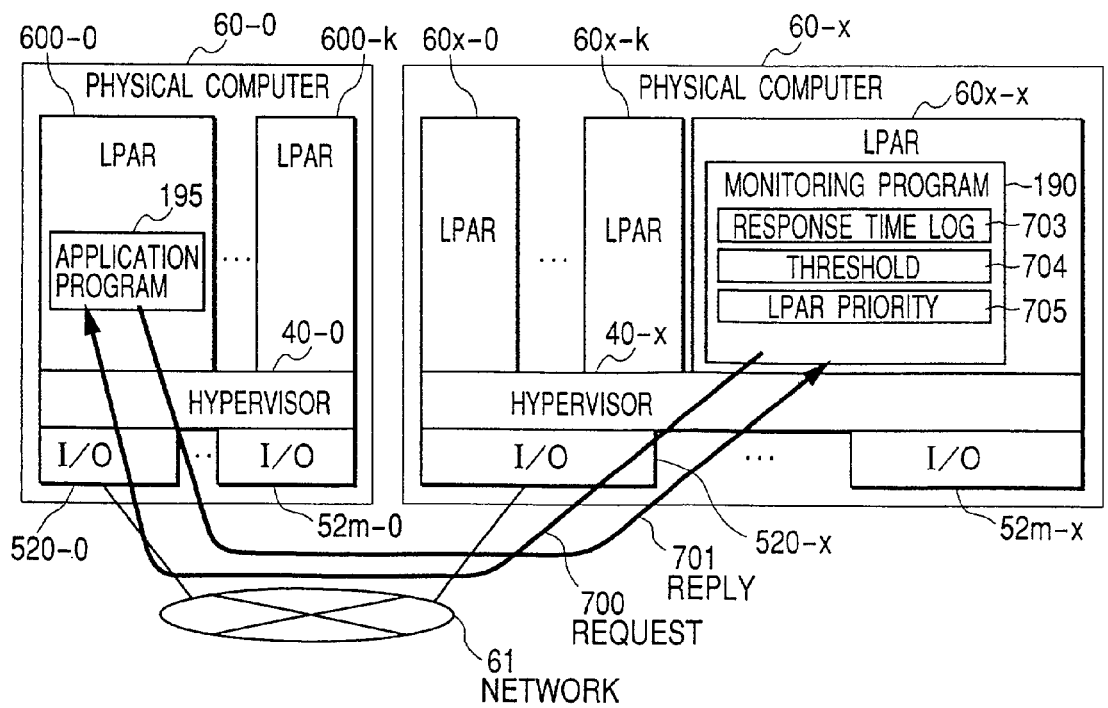
FIG. 21 is a diagram illustrating another acquisition method of response time of an application program according to another embodiment of the present invention.

In FIG. 21, there is provided physical computers 60-0, 60-x and a network 61 for linking therewith, and on the physical computers, LPAR600-0, LPAR600-k, LPAR60x-0, LPAR60x-k, and LPAR60x-x are operated. In the LPAR600-0 on the physical computer 60-0, an application program 195 such as WWW (World Wide Web) server is operated. The monitoring program 190 operating in LPAR60x-x on the physical computer 60-x issues an access demand 700 of data to the application program 195. If the application program 195 is the WWW server, a demand to read homepages is issued. The application program 195 issues a response 701 for the demand 700. In the monitoring program 190, the response time from issue of the demand 700 till reception of the response 703 is recorded to a response time history 703. The demand 700 is issued in an interval which does not deteriorate a performance of the application program 195. Or, it may be set by the operator in advance within the monitoring program (not shown).

The monitoring program 190 observes transition of the response time history 703. When long response time continues, the monitoring program 190 demands that allocation of physical resources of LPAR having the application program with the long response time operating therein to be increased. A procedure to change the resource allocation follows in Embodiment 4. Moreover, the monitoring program 190 may gather the response time history for a relatively long period of time (for several days) to find out regularity of load fluctuations so that physical resource allocation of LPAR may be designedly changed according to a cycle of the fluctuation.

As described above, the application program does not measure response time, or when there is no interface to read out a measurement result, the monitoring program issues an access demand of the data so that it measures a duration until the response therefor is received. In the embodiment, by storing the response time history, the response time of the application program is comprehended. Thereby, it is possible to comprehend the response time even if the application program does not measure the response time or there is no response time.

Embodiment 6

Figure 23:
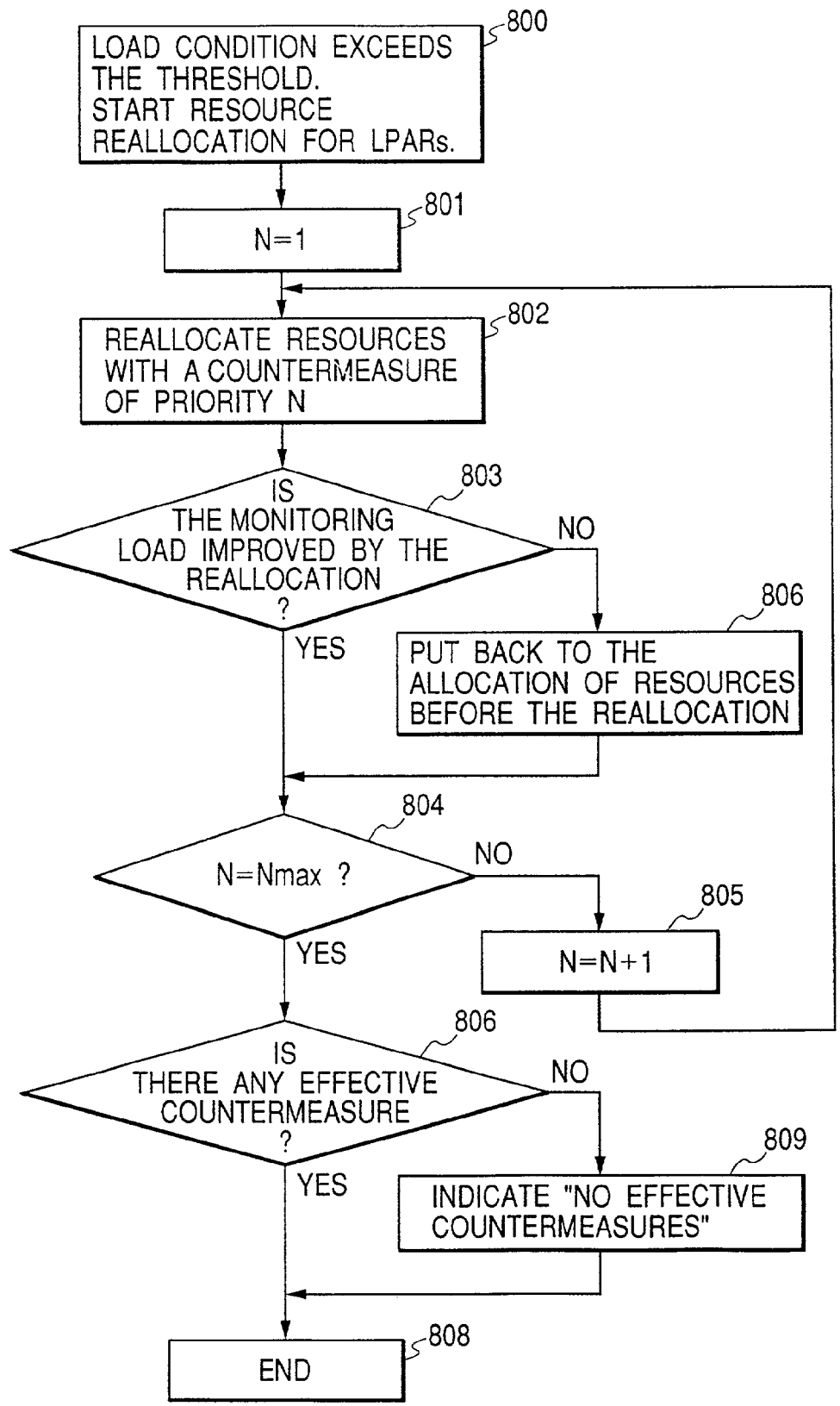
FIG. 23 is a flow-chart illustrating a process for conducting a sequential dealing in accordance with FIG. 22.

In Embodiments 2 and 3, action plans corresponding to load conditions are determined in advance. Alternatively, by forming a table (FIG. 22) which lists a priority order of possible polices by physical resource allocation, an action can be taken sequentially with a procedure shown in FIG. 23. Hereinbelow, the procedure shown in FIG. 23 will be described.

Load conditions of LAPRs are gathered in a manner shown in previous embodiments. When the load conditions exceeds the threshold set by the operator, preparation for reallocation of LPARs starts (800). Assume that there are total of Nmax action plans. First, the action plan of priority 1 (801) as shown in FIG. 22 is conducted (802). When the load condition does not improve after operating LPAR which has applied the action plan, the allocation is reversed to the previous allocation (806). Whether all action plans are taken is confirmed (804). If not all the plans are conducted, then, next action plan is implemented (805). After all plans are implemented, it is checked if there has been any effect action (806). In a case where no effective plan existed, the fact that the load action has been impossible is notified to the operator by way of screen display, a log file, or a buzzer (809). By following this flow, a plurality of actions are collectively taken as long as these are effective.

As described above, a plurality of action plans are prepared along with priority thereof so that one or more action plans contributing to load lowering. Accordingly, actions effective for lowering the load is selected by trial.

Embodiment 7

For an operation mode which greatly changes its load between day time and night time, there is provided an application method in which allocation changes according to a plan, that is, during hours when load is high, resources are collected from other LPARs whereas during night time, some of resources are released to the other LPARs. There is also a method combining means for finding regularity in load change with Embodiment 1. Hereinbelow, the method having the means for finding regularity in load change combined with Embodiment 1 will be described.

One way to find out regularly changing load, the load is recorded for several days, and the load monitor examines up and down of the load at the same time zone. For example, as shown in FIG. 12, changes in average values of load fluctuation taken at the same hour for several days are examined. Then, threshold of the load is set so that allocation of physical resources increased during the time zone of high load while the resources are offered to other LPARs during the low load time zone. Moreover, the load monitor 207 schedules to return resource allocation to initially set amount during time zones other than above. Resource allocation method is as follows: by setting a system condition with a maximum load during the time zone above high load threshold (i.e., when a length of queue for execution of process becomes 3 or more) as a basis, the reallocation policy generator 206 generates reallocation plan in the method shown in Embodiment 1 so as to conduct dynamic reallocation of resources. Moreover, not only changing resource allocation periodically, dynamic resource allocation may be conducted with respect to load conditions so as to conduct find adjustment for reducing the load.

Figure 13:
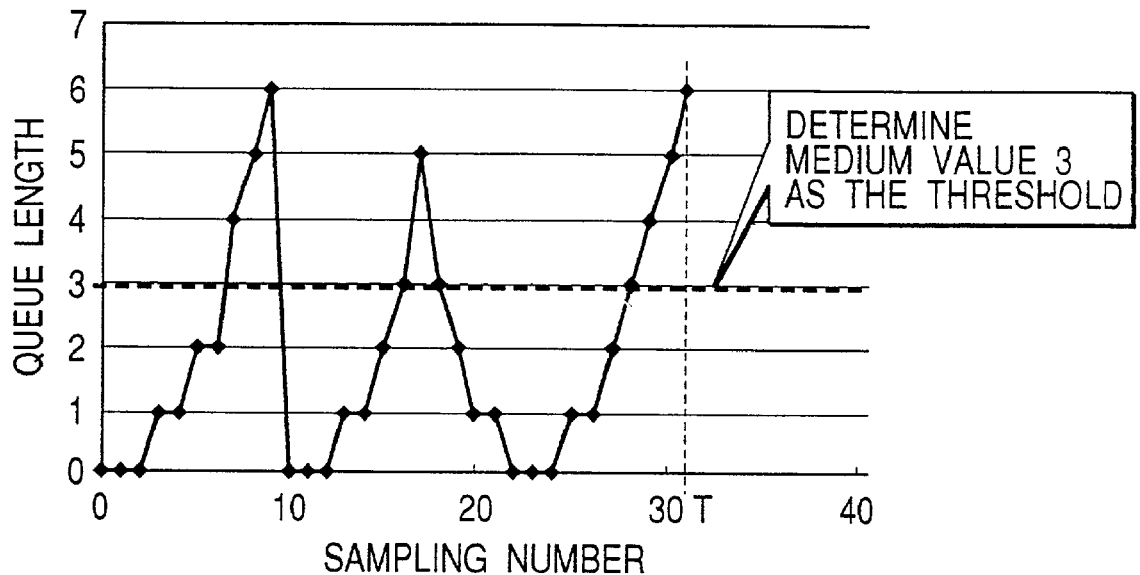
FIG. 13 is a diagram illustrating a sampling data of the CPU load of LPAR according to the other embodiment of the present invention.
Figure 14:
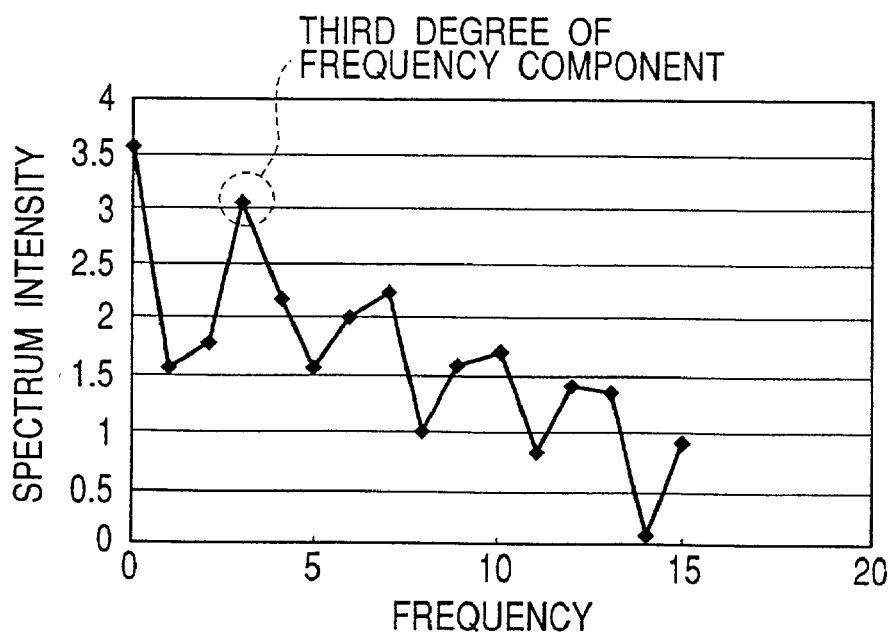
FIG. 14 is a diagram illustrating spectrum distribution of the sampling data of the CPU load according to the above-described embodiment.

As a means to obtain regularity in load, a method for finding changing regularity of the load analytically may be employed. Herein, FFT (fast Fourier transformation) is used as an example to find out regularity of change in load analytically. Regarding algorithm of the FFT, textbooks of signal processes such as "Dejitaru Shingou Shori no Kiso Tujii Shigeo kanshu Denshi Jouho Tsushin Gakkai" (Mar. 15, 1998 first edition published). As shown in FIG. 13, assume that load conditions of time series having 32 measuring points in T time are provided. Herein, a length of queue for execution of process is uses as an example. FIG. 13 is calculated for its spectrum distribution by FFT, the result becomes as shown in FIG. 14 (In the signal process, the spectrum distribution equals power spectrum distribution, but it is only expressed as the spectrum distribution herein.) According to sampling theorem, order of higher harmonic that can be analyzed is 16. This is to examine the regularity of change in load, and thus, by ignoring 0 frequency which equals a direct current component, the strongest degree of spectrum is frequency of order of 3 (i.e. $3/2\pi T$) Now, assuming that the load fluctuate with frequency of $3/2\pi T$, physical resource allocation to LPAR is changed. At that time, based on numerical values of the maximum load in FIG. 13, physical resource allocation configuration is formed. Intermediate value between the minimum load and the maximum load is set as a threshold, and if the load increased to reach the threshold, LPAR is reallocated according to the allocation configuration generated previously. In the present embodiment, there is a case where allocation changes for every half cycle. Alternately, allocation of physical resources to LPARs may be conducted by dividing more finely. The procedure of reallocation of LPAR is as described in Embodiment 1.

As described above, as a means to obtain regularity of load, a method for finding the regularity of change in load analytically, i.e., FFT, is used, and therefore, the load fluctuation can be obtained accurately without relying on subjectivity of a person such as an operator.

Embodiment 8

From Embodiments 1 to 7, loads related to CPU (physical processor) has been described as examples. Alternatively, resource allocation of LPAR may be changed according to load conditions of main memory. Resource allocations of CPU and main memory may be conducted simultaneously.

As an index expressing load conditions of main memory, the number of times of swap or paging may be used. Similar to the case of CPU loads according to Embodiment 1, load conditions are monitored for those, and LPAR having high load condition is reallocated dynamically so as to increase main memory allocated therefor. LPAR which changes the main memory amount stops the OS operating on the LPAR similar to the case where the number of CPUs are increased as shown in Embodiment 1. After physical resources is allocated (i.e., the amount of main memory is changed herein), the LPAR controller 202 notifies the OS on the LPAR, directly or through the logical processor controller 203, of newly allocated main memory by interruption or the like. Then, the OS on the LPAR spontaneously sends a command to expand the newly added main memory to corresponding LPAR controller 202. In the present embodiment, the allocation changing method as described in Embodiment 2 or Embodiment 3 may be applied.

As described above, it is possible to judge if capacity of allocated main memory is insufficient.

Embodiment 9

In the present embodiment, an example using the virtual computer system in data center is shown. A data center administrator makes an agreement with each customer with a content of an agreement table as shown in FIG. 24. The agreement class 1000 has priority in an order of A, B and C, and the agreement has the highest priority. For every agreement class 1000, the agreement fee is determined as PA, PB and PC. The agreement A is made with customers in such a manner that the higher the priority of agreement is, the more priority is given to the performance guarantee of the response time or the like of the application.

The data center administrator sets an allocation 1007 and an agreement class 1006 of LPAR for each customer 1005 as shown in FIG. 26. The application program of each customer is operated on the LPAR. The LPAR having higher priority 1002 is allocated with physical resources by priority. The data center administrator follows a table shown in FIG. 25 to decide the priority 1002, an upper threshold 1003, and a lower threshold 1004 of load conditions of LPAR for every agreement class 1000. The upper threshold 1003 is the maximum value of allowable limit in which load of the OS or the application operating on the LPAR is large, i.e., it is a numerical value used to judge an opportunity to demand an increase of resource allocation toward the LPAR. The lower threshold 1004 is used to judge an opportunity for returning the resource amount allocated to the LPAR to the initial value when the load is smaller than the threshold. A table shown in FIG. 25 is stored inside a means for monitoring load conditions of the virtual computer.

Figure 27:
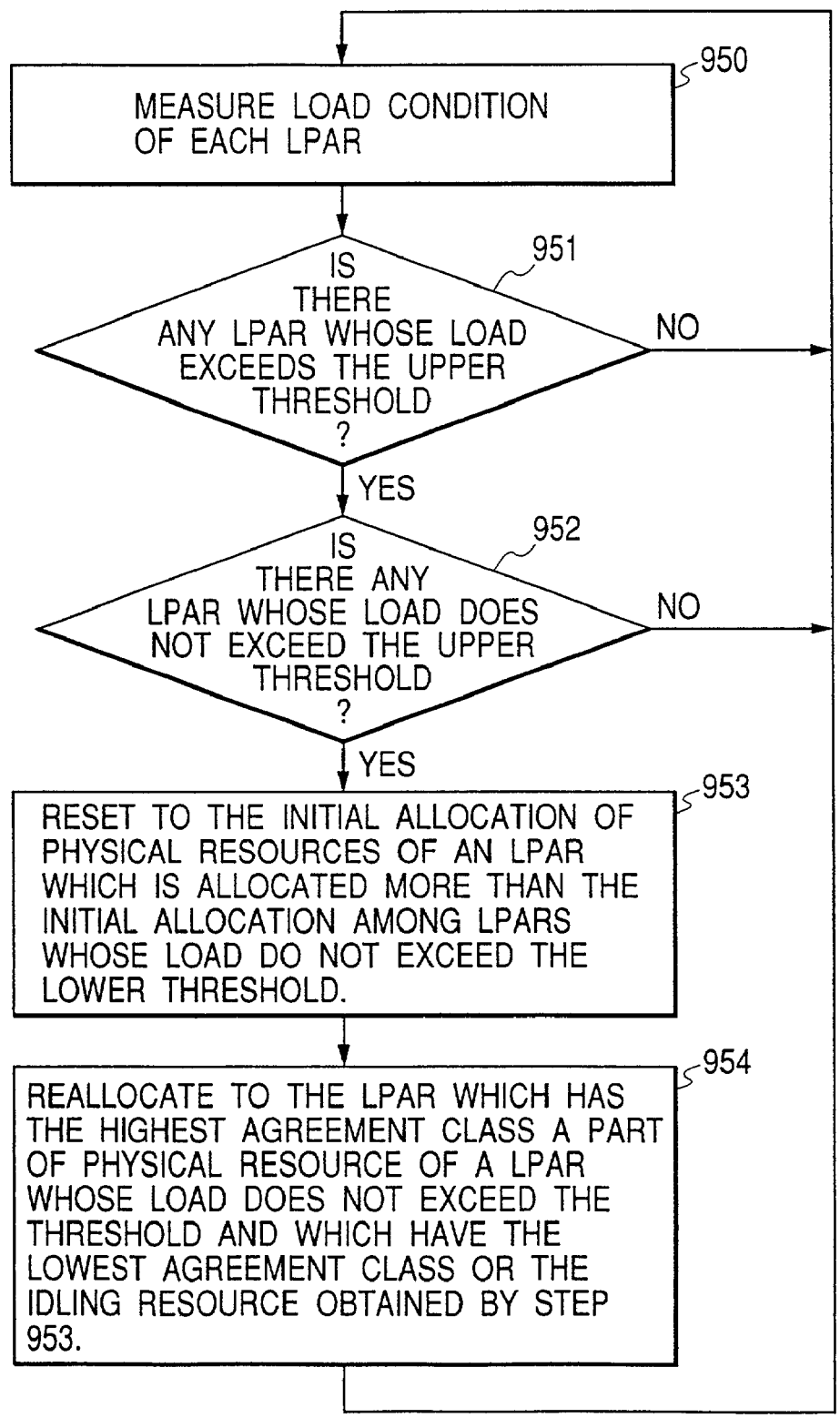
FIG. 27 is a flowchart of a management program at a data center.

Referring now to FIG. 27, a flow of administrating the data center will be described. First, in the means for monitoring load conditions of LPARs as shown in Embodiments 1 to 8, the load conditions of LPAR are observed (950). It is checked that if there is a load condition which exceeds the upper threshold 1003 shown in FIG. 25 (951). If there is no LPAR exceeding the upper threshold 1003, administration thereof continues without changing allocation of LPAR. However, if there is the LPAR exceeding the upper threshold, and not all LPAR has high load (952), then an action for loads can be taken.

Before starting resource allocation to the LPAR having high load, physical resources allocated to the LPAR having loads not exceeding the lower threshold is released (953). At that time, the amount of resources allocated to the LPAR is returned to the initially set numerical value. Next, to the LPAR exceeding the upper threshold and having the highest priority, physical resources released previously or a part of resources from LPAR having low priority and not exceeding threshold are transferred (954). Algorithm for transferring those resources may be the method in Embodiment 1. As such, recourse allocation of the LPAR is changed.

As described above, the example for allocating resources by priority according to the agreement class is shown. According to this, it is possible to provide a service corresponding to the agreement fee and a customer property.

What is claimed is:

1. A virtual computer system, comprising:
a plurality of virtual computers operating on a physical computer having one or more CPUs and a main memory device;
a hypervisor;
a storing section for storing contents of a plurality of actions for changing physical resources allocated to virtual computers judged as having high loads by a load monitor which monitors load conditions of said virtual computers; and
means for implementing said plurality of actions sequentially and for conducting physical resource allocation according to contents of said actions that are deemed most effective in lowering loads of said virtual computers,
wherein said hypervisor comprises:
said load monitor for monitoring load conditions of said virtual computers based on load conditions of said main memory device
a reallocation section for providing an output for dynamically changing allocation of physical resources to said virtual computers based on said load conditions monitored by said load monitor and
a controller for controlling physical resource allocation to said virtual computers based on load conditions monitored by said load monitor, and for demanding reallocation in response to said output from said reallocation section, and
wherein a result of implementing said actions is fed back to said means for implementing to permit selection of actions that are most effective.

2. A virtual computer system according to claim 1, wherein said load monitor collects load data corresponding to load conditions of at least one of said virtual computers with a fixed interval, and detects periodic regular changes of the collected load data, and
wherein said controller demands said physical resource allocation based on said periodic changes of the collected load data, and demands periodical allocation of physical resources to said reallocation section.

3. A virtual computer system according to claim 1, wherein said controller decides a priority order of allocation of physical resources to each virtual computer in response to the output from said reallocation section according to information of customers using said virtual computers and agreement conditions with the customers.

4. A virtual computer system according to claim 3, wherein said controller uses a reference value to judge an overload condition for each virtual computer, said reference value indicating according to the customers and agreement conditions an amount of load permitted for the virtual computer.

5. A virtual computer system, comprising:
a plurality of virtual computers operating on a physical computer having one or more CPUs, each of said plurality of virtual computers having an OS for controlling execution of an application program;
a hypervisor;
a storing section for storing contents of a plurality of actions for changing physical resources allocated to virtual computers judged as having high loads by a load monitor which monitors load conditions of said virtual computers; and
means for implementing said plurality of actions sequentially and for conducting physical resource reallocation according to contents of said actions that are selected as effective in lowering loads of said virtual computer having effectiveness for lowering the load, wherein said hypervisor comprises:
said load monitor for monitoring load conditions of said virtual computers based on a response time of a process of said application program in each of said virtual computers,
a reallocation section for providing an output for dynamically changing allocation of physical resources to said virtual computers based on said load conditions monitored by said load monitor, and
a controller for controlling physical resource allocation to said virtual computers based on load conditions monitored by said load monitor, and for demanding reallocation in response to said output from said reallocation section,
wherein a result of imolementina said actions is fed back to said means for implementing to permit selection of actions that are deemed effective.

6. A virtual computer system according to claim 5, wherein said load monitor collects load data corresponding to load conditions of at least one of said virtual computers with a fixed interval, and detects periodic regular changes of the collected load data; and
wherein said controller demands said physical resource allocation based on said periodic changes of the collected load data, and demands periodical allocation of physical resources to said reallocation section.

7. A virtual computer system according to claim 5, wherein said controller decides a priority order of allocation of physical resources to each virtual computer in response to the output from said reallocation section according to information of customers using said virtual computers and agreement conditions with the customers.

8. A virtual computer system according to claim 7, wherein said controller uses has a reference value to judge an overload condition for each value computer, said reference value indicating according to the customers and agreement conditions an amount of load permitted for the virtual computer.

* * * * *